United States Patent
Lee

(10) Patent No.: US 12,110,019 B2
(45) Date of Patent: Oct. 8, 2024

(54) VEHICLE DRIVING CONTROL SYSTEM AND METHOD

(71) Applicant: HYUNDAI MOBIS Co., Ltd., Seoul (KR)

(72) Inventor: Jeong Hee Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 239 days.

(21) Appl. No.: 17/558,983

(22) Filed: Dec. 22, 2021

(65) Prior Publication Data

US 2022/0219690 A1 Jul. 14, 2022

(30) Foreign Application Priority Data

Jan. 11, 2021 (KR) .................. 10-2021-0003460
Jan. 12, 2021 (KR) .................. 10-2021-0004045

(51) Int. Cl.
*B60W 30/14* (2006.01)
*B60W 30/095* (2012.01)
(Continued)

(52) U.S. Cl.
CPC ...... *B60W 30/143* (2013.01); *B60W 30/0956* (2013.01); *B60W 40/04* (2013.01);
(Continued)

(58) Field of Classification Search
CPC ...... B60W 10/04; B60W 10/18; B60W 10/20; B60W 30/09; B60W 30/0956; B60W 30/143; B60W 30/16; B60W 30/18163; B60W 40/04; B60W 40/068; B60W 40/072; B60W 40/08; B60W 40/105; B60W 50/0098; B60W 2040/0818; B60W 2050/0022; B60W 2520/10; B60W 2520/125; B60W 2540/229; B60W 2552/05; B60W 2552/10; B60W 2552/30;
(Continued)

(56) References Cited

U.S. PATENT DOCUMENTS 10,703,373 B2 * 7/2020 Fernando ............ B60W 30/188
2009/0198426 A1 * 8/2009 Yasui .................... B60W 10/11
701/70

(Continued)

FOREIGN PATENT DOCUMENTS

KR     10-1470231 B1    12/2014

*Primary Examiner* — Peter D Nolan
*Assistant Examiner* — Ce Li Li
(74) *Attorney, Agent, or Firm* — MORGAN, LEWIS & BOCKIUS LLP

(57) ABSTRACT

The present disclosure discloses a vehicle driving control system including a road information device calculating road information of a curved road on which the vehicle drives; a road surface information device calculating road surface condition of a road; a neighboring vehicle information device calculating location information or movement information of the neighboring vehicle located close to the vehicle; and a computing device computing a target speed based on the road information calculated by the road information device, the road surface condition calculated by the road surface information device, and the location information or movement information of the neighboring vehicle calculated by the neighboring vehicle information device.

8 Claims, 5 Drawing Sheets

(51) Int. Cl.
    *B60W 40/04*         (2006.01)
    *B60W 40/068*      (2012.01)
    *B60W 40/072*      (2012.01)
    *B60W 40/08*        (2012.01)
    *B60W 40/105*      (2012.01)
    *B60W 50/00*        (2006.01)
    *G06V 10/60*        (2022.01)
    *G06V 20/59*        (2022.01)

(52) U.S. Cl.
    CPC ........ *B60W 40/068* (2013.01); *B60W 40/072* (2013.01); *B60W 40/08* (2013.01); *B60W 40/105* (2013.01); *B60W 50/0098* (2013.01); *G06V 10/60* (2022.01); *G06V 20/597* (2022.01); *B60W 2040/0818* (2013.01); *B60W 2050/0022* (2013.01); *B60W 2540/229* (2020.02); *B60W 2552/30* (2020.02); *B60W 2552/40* (2020.02); *B60W 2554/4041* (2020.02); *B60W 2554/4044* (2020.02); *B60W 2555/20* (2020.02); *B60W 2556/40* (2020.02)

(58) Field of Classification Search
    CPC ......... B60W 2555/20; B60W 2556/40; B60W 2556/50; B60W 2720/10; G06V 10/60; G06V 20/56; G06V 20/597; G08G 1/166; G08G 1/167
See application file for complete search history.

(56) References Cited

U.S. PATENT DOCUMENTS

| | | | | |
|---|---|---|---|---|
| 2011/0178689 | A1* | 7/2011 | Yasui | B60W 40/076 |
| | | | | 701/70 |
| 2012/0203440 | A1* | 8/2012 | Matsunaga | B60T 7/12 |
| | | | | 701/93 |
| 2017/0169631 | A1* | 6/2017 | Walker | G07C 5/0808 |
| 2018/0001892 | A1* | 1/2018 | Kim | B60W 40/04 |
| 2018/0297594 | A1* | 10/2018 | Takahashi | B60W 10/04 |
| 2018/0362001 | A1* | 12/2018 | Inou | B60W 30/18145 |
| 2019/0276018 | A1* | 9/2019 | Kim | B60W 30/16 |
| 2019/0322308 | A1* | 10/2019 | Adachi | B60W 10/04 |
| 2020/0062255 | A1* | 2/2020 | Fernando | B60W 30/188 |
| 2021/0078575 | A1* | 3/2021 | Machida | B60W 50/082 |
| 2021/0179092 | A1* | 6/2021 | Chen | B60W 10/04 |
| 2023/0041499 | A1* | 2/2023 | Uestuenel | B60W 40/072 |

* cited by examiner

VEHICLE DRIVING CONTROL SYSTEM AND METHOD

CROSS REFERENCE TO RELATED APPLICATION

The present application claims priority to Korean Patent Application No. 10-2021-0003460, filed Jan. 11, 2021 and to Korean Patent Application No. 10-2021-0004045, filed Jan. 12, 2021, the entire contents of which is incorporated herein for all purposes by this reference.

BACKGROUND

Technical Field

The present disclosure relates to a technology for controlling the driving of a vehicle so that the vehicle drives safely while driving on a curved road.

Description of the Related Art

The automobile industry has paid much attention to the advanced driving assistance system (ADAS) in recent years. The advanced driving assistance system is a system that uses sensors mounted in a vehicle for early detection of, and response to, dangerous situations that arise while driving, thereby ensuring the safety of a driver and providing the driver with convenience.

Operation failure and malfunction of such an advanced driver assistance system directly lead to an accident of a vehicle, and thus, the development of a reliable advanced driving assistance system configured to control accurately without error is needed.

The conventional vehicle driving control system calculates the target speed of the vehicle regardless of the type of road on which the vehicle drives, and this poses a problem that driving on a curved road at the same speed as on a straight road increases the probability of a collision.

The matters described above as a technical background are intended only for a better understanding of the background of the present disclosure and are not to be taken as acknowledgment that they pertain to the conventional art already known to those skilled in the art.

SUMMARY

The present disclosure is proposed to address the issue described above, and an object of the present disclosure is to reduce the accident probability that a vehicle faces on a curved road by computing a target speed of the vehicle based on road information and road surface information of the curved road when the vehicle drives on the curved road.

A vehicle driving control system according to an aspect of the present disclosure includes a road information device calculating road information of a curved road on which a vehicle drives; a road surface information device calculating road surface condition of a road; a neighboring vehicle information device calculating location information or movement information of a neighboring vehicle located close to the vehicle; and a computing device computing a target speed based on the road information calculated by the road information device, the road surface condition calculated by the road surface information device, and the location information or movement information of the neighboring vehicle calculated by the neighboring vehicle information device.

The road information device may be connected to a navigator mounted in the vehicle to calculate the radius of curvature of the curved road on which the vehicle drives based on the information obtained from the navigator, and the computing device may compute the target speed based on the radius of curvature.

The computing device may compute reference speed of the vehicle based on the radius of curvature of the curved road compute by the road information device, calculate a weight based on the road surface condition calculated by the road surface information device, compute subtraction speed based on the weight, and compute the target speed by subtracting the subtraction speed from the reference speed.

The computing device may calculate the subtraction speed by putting the computed weight into a pre-mapped map.

The road surface information device may be connected to a road surface detection sensor mounted in the vehicle to calculate the friction coefficient of the driving road, and the computing device may compute the target speed based on the friction coefficient.

The computing device may compute a weight in proportion to the magnitude of the friction coefficient of the driving road calculated by the road surface information device, compute the reference speed based on the road information calculated by the road information device, compute the subtraction speed based on the weight, and compute the target speed by subtracting the subtraction speed from the reference speed.

The computing device may reduce the target speed when a present location of the vehicle is in a cautious driving zone according to the road information calculated by the road information device.

A temperature information device connected to a temperature sensor mounted in the vehicle to calculate temperature information outside the vehicle may be further included, and the computing device may compute the target speed in proportion to the temperature information calculated by the temperature information device.

A luminance information device connected to a luminance sensor mounted in the vehicle to calculate luminance information outside the vehicle may be further included, and the computing device may compute the target speed in inverse proportion to the luminance information calculated by the luminance information device.

The computing device may classify a detection zone in which a neighboring vehicle is detected into a plurality of sub-zones according to the level of collision risk based on the location information of the neighboring vehicle and compute the target speed based on the location information of the neighboring vehicle detected in the detection zone.

The computing device may compute to reduce the target speed when the neighboring vehicle information device calculates the lateral movement of the neighboring vehicle.

The computing device may reduce the target speed when a present location of the vehicle is in the cautious driving zone according to the road information calculated by the road information device.

A driver detection device calculating the driving concentration level of the driver may be further included, and the computing device may compute the target speed in inverse proportion to the driving concentration level calculated by the driver detection device.

A vehicle driving control method according to the present disclosure includes calculating the road condition of a curved road on which the vehicle drives; calculating road surface condition of a road; calculating location information or movement information of a neighboring vehicle located close to the vehicle; and computing target speed based on the road information calculated in the calculating of the road information and the road surface condition calculated in the calculating of the road surface information.

Calculating temperature information outside the vehicle may be further included, and the target speed may be computed in proportion to the temperature information calculated in the calculating of the temperature information.

Calculating luminance information outside the vehicle may be further included, and the target speed may be computed in inverse proportion to the luminance information calculated in the calculating of the luminance information.

Detecting a driver for calculating the driving concentration level of the driver may be further included, and the target speed may be computed in inverse proportion to the driving concentration level calculated in the detecting of the driver.

The vehicle driving control system according to an aspect of the present disclosure has the effect that the target speed of the driving vehicle may be computed based on the curvature information included in the information on the curved road and the friction coefficient included in the road surface information when the vehicle drives on a curved road.

In addition, there is an effect of inducing the driver to drive safely by informing the driver of the calculated target speed through the vehicle cluster in the case of a regular vehicle and controlling the vehicle so that the vehicle drives at the calculated target speed in the case of an autonomous vehicle.

DETAILED DESCRIPTION

Figure 1:
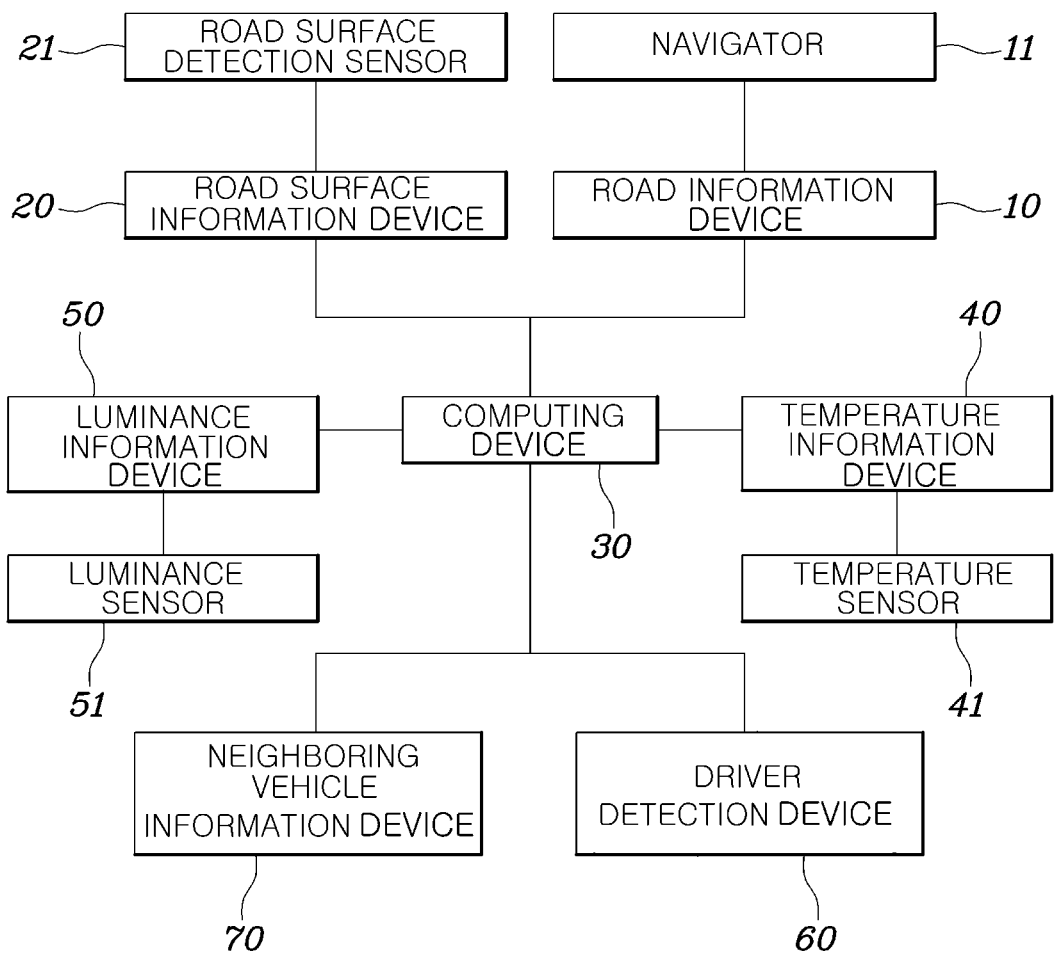
FIG. 1 is a block diagram showing a vehicle driving control system according to an embodiment of the present disclosure.

Specific structural or functional descriptions of the embodiments of the present disclosure disclosed in the present specification or application are presented by way of examples only for the purpose of describing the embodiments according to the present disclosure, and the embodiments according to the present disclosure may be implemented in various forms and are not to be construed as being limited to the embodiments described in the present specification or application.

Since the embodiment of the present disclosure may be modified in various ways and have various forms, specific embodiments will be illustrated in the drawings and described in the present specification or application. However, this is not intended to limit the embodiments according to the concept of the present disclosure to the specific forms and is to be construed as including all modifications, equivalents, and substitutes included in the spirit and technical scope of the present disclosure.

Terms such as first and/or second may be used to describe various components, but the components are not to be limited by the terms. The terms only serve the purpose of distinguishing one component from other components. For example, the first component may be referred to as the second component, and similarly, the second component may also be referred to as the first component without deviating from the scope of the right according to the concept of the present disclosure.

When a component is referred to as being "connected" or "coupled" to another component, it may be directly connected or coupled to the another component, but it is to be understood that other components may exist in between. On the other hand, when a component is referred to as being "directly connected" or "directly coupled" to another component, it is to be understood that there are no intervening components present. Other expressions describing the relationship between components such as "between" and "just between", or "adjacent to" and "directly adjacent to" are to be interpreted in the same manner.

The terms used herein are used for the purpose of describing particular embodiments only and are not intended to limit the disclosure. Singular expressions include plural expressions unless the context explicitly indicates otherwise. In the present specification, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present disclosure pertains. It will be further understood that terms, such as those defined in commonly used dictionaries, is to be interpreted as having a meaning that is consistent with their meaning in the context of the present specification, and will not be interpreted in an idealized or overly formal sense unless expressly so defined herein.

In the following, the present disclosure will be described in detail by describing preferred embodiments of the present disclosure with reference to the accompanying drawings. The same reference numerals shown in each drawing indicate the same members.

A road information device 10, a road surface information device 20, a computing device 30, a temperature information device 40, a luminance information device 50, a driver detection device 60, and a neighboring vehicle information device 70 according to an embodiment of the present disclosure may be implemented through a processor (not shown) configured to perform operations to be described below using an algorithm configured to control the operations of various components of a vehicle 100 or a nonvolatile memory (not shown) configured to store data relating to software commands for reproducing the algorithm and the data stored in the memory. Here, the memory and the processor may be implemented as individual chips. Alternatively, the memory and the processor may be implemented as a single integrated chip. The processor may take the form of one or more processors.

Figure 2:
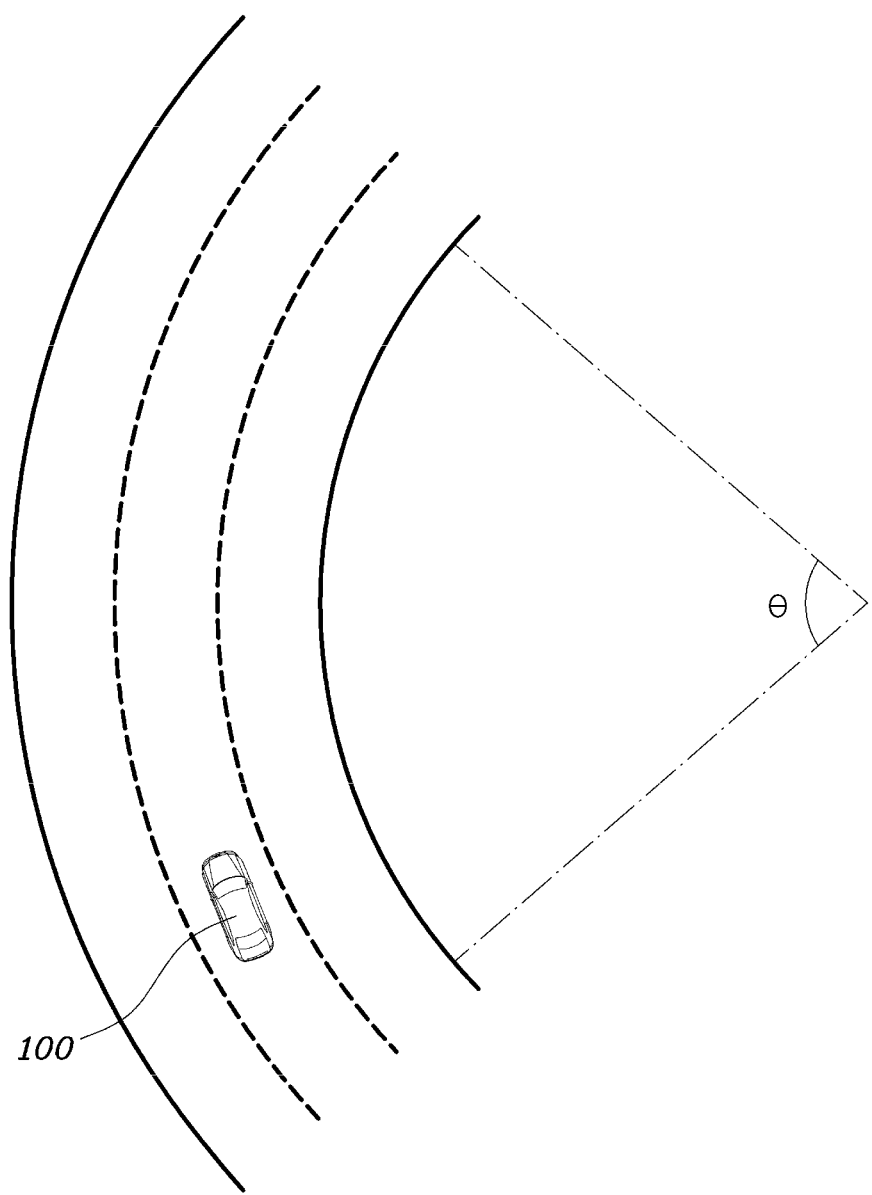
FIG. 2 is a view showing a vehicle driving on a curved road.
Figure 3:
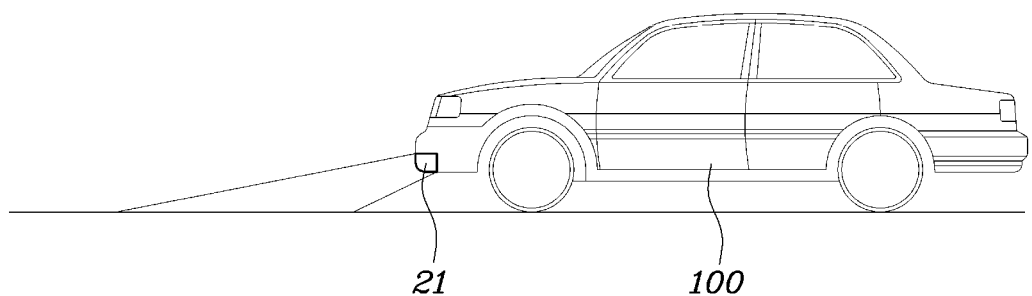
FIG. 3 is a view showing the detection of a road surface through a road surface detection sensor mounted in a vehicle.
Figure 4:
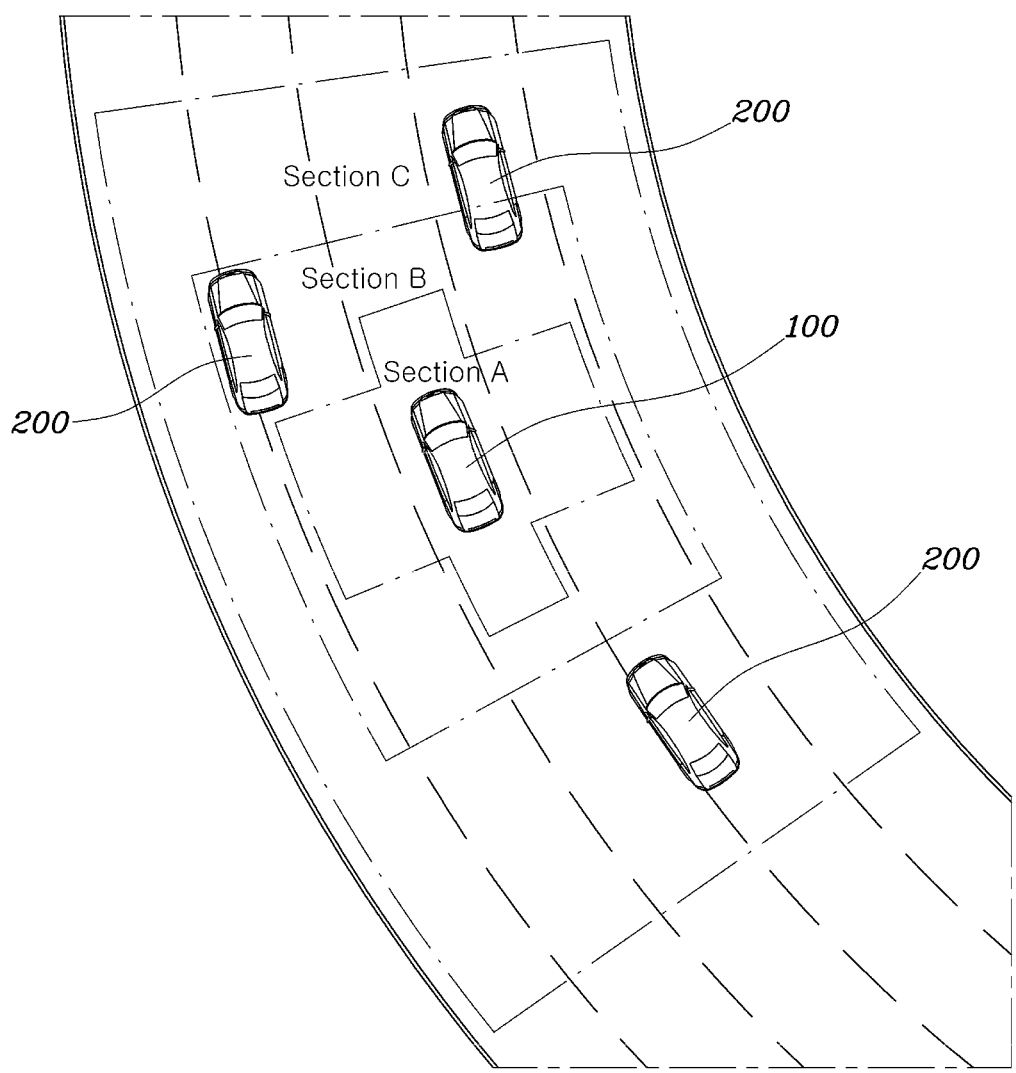
FIG. 4 is a view showing a vehicle detecting neighboring vehicles when driving on a curved road.

FIG. 1 is a block diagram showing a vehicle driving control system of a vehicle 100 according to an embodiment of the present disclosure, FIG. 2 is a view showing a vehicle 100 driving on a curved road, FIG. 3 is a view showing detection of a road surface through a road surface detection sensor 21 mounted in a vehicle 100, and FIG. 4 is a view showing a vehicle detecting neighboring vehicles when driving on a curved road.

An embodiment of a driving control system of a vehicle 100 according to the present disclosure will be described with reference to FIGS. 1 to 3.

The driving control system of the vehicle 100 according to the present disclosure may compute a target speed of the vehicle 100 on a curved road to induce a driver to drive safely by informing the driver of the calculated target speed through a cluster of the vehicle 100 in the case of a regular vehicle 100 and to control the vehicle 100 so that the vehicle 100 drives at the calculated target speed in the case of an autonomous vehicle 100.

The driving control system of the vehicle 100 according to the present disclosure includes a road information device 10 calculating road information of a curved road on which the vehicle 100 drives; a road surface information device 20 calculating a road surface condition of a road; and a computing device 30 computing a/the target speed based on the road information calculated by the road information device 10 and the road surface condition calculated by the road surface information device 20.

When the vehicle 100 drives on the road, the road information device 10 may calculate road information such as the inclination of the driving road, length of a straight road, number of lanes, width of a lane, or radius of curvature of a curved road.

The road surface information device 20 may calculate information on the road surface condition of the road on which the vehicle 100 drives, and the road information device 10 may calculate road surface condition information including a friction coefficient of the road surface and whether the road is paved or not.

The computing device 30 may compute the target speed of the vehicle 100 on a curved road by a predetermined computation formula based on the road information including the radius of curvature of a curved road or the width of road calculated by the road information device 10 and the road surface condition of the driving road calculated by the road surface information device 20.

In addition, the neighboring vehicle information device 70 may be connected to a radar sensor, a lidar sensor, an ultrasonic sensor, or a camera sensor detecting a neighboring vehicle 200 driving close to the vehicle 100, calculate movement information based on the location information of the neighboring vehicle 200 detected by the detection sensors, and the location information and movement information of the neighboring vehicle 200 may be calculated through this. In addition, a plurality of neighboring vehicles 200 in the proximity of the vehicle 100 may be detected.

The location information may be a relative location of the neighboring vehicle 20 with respect to the vehicle 100 in the longitudinal and lateral directions, and the movement information may be velocity and acceleration between the neighboring vehicle 200 and the vehicle 100 in the longitudinal and lateral directions.

The computing device 30 may compute the target speed of the vehicle 100 on a curved road by a predetermined computation formula based on the road information including the radius of curvature of the curved road or the width of the road calculated by the road information device 10 and the location information and movement information of the neighboring vehicle 200 calculated by the neighboring vehicle information device 70.

The target speed may be a speed to which the speed of the vehicle 100 driving on a straight road is reduced to enable the maintenance of safe driving on a curved road.

In addition, the computing device 30 may compute the base speed based on the neighboring vehicle 200 in the front, compute subtraction speed based on the location information or movement information of the neighboring vehicle 200 additionally detected close to the vehicle 100 and the width or the radius of curvature of the curved road, and compute the target speed by subtracting the subtraction speed from the base speed.

The vehicle 100 may include a regular vehicle 100 driven by a driver or an autonomous vehicle 100 driven by autonomous driving.

In the case of a regular vehicle 100, there is the effect of inducing a driver to drive safely by informing the driver of the target speed on a curved road calculated by the computing device 30 through a cluster of the vehicle 100 or inducing the driver to drive safely by setting off an alarm when the speed of the vehicle 100 exceeds the target speed.

In the case of an autonomous vehicle 100, the vehicle is driven at the target speed to which the base speed is reduced so that there is the effect of reducing the probability of collision of the vehicle 100 that may occur on a curved road.

The road information device 10 may be connected to the navigator 11 mounted in the vehicle 100 to calculate the radius of curvature of a curved road on which the vehicle 100 drives based on the information obtained from the navigator 11, and the computing device 30 may compute the target speed based on the radius of curvature.

The navigator 11 may be mounted in the vehicle 100 to calculate the present location, driving direction, and driving speed of the vehicle 100 through satellite communication, and the information of the road on which the vehicle 100 drives including the width, number of lanes, length of straight road, length and radius of curvature of the curved road of the road is entered into the navigator 11 in advance. The road information device 10 may be connected to the navigator 11 to calculate the road information.

At this time, the computing device 30 may compute the target speed based on the radius of curvature of the curved road calculated by the road information device 10. The specific calculation of the target speed according to the radius of curvature will be described below.

The computing device 30 may calculate reference speed based on the movement information of the neighboring vehicle 200 calculated by the neighboring vehicle information device 70, compute the subtraction speed based on the road information calculated by the road information device 10 and the location information or movement information of the neighboring vehicle 200 calculated by the neighboring vehicle information device 70, and compute the target speed by subtracting the subtraction speed from the reference speed.

The computing device 30 may compute the reference speed that allows the maintenance of the distance between the neighboring vehicle 200 and the vehicle 100 based on the location information and movement information of the neighboring vehicle 200 located in front of the vehicle 100 calculated by the neighboring vehicle information device 70, compute the subtraction speed by a predetermined computation formula based on the road information calculated by the road information device 10 and the location information or movement information of an additional neighboring vehicle 200 calculated by the neighboring vehicle information device 70, and compute the target speed by subtracting the subtraction speed from the reference speed.

Detected factors contributing to the reduction of the target speed may cause the computing device 30 to compute such that the subtraction speed increases. The factors will be described below.

The computing device 30 may set the detection zone in which the neighboring vehicle 200 is detected into a plurality of sub-zones according to the level of collision risk based on the location information of the neighboring vehicle 200 and compute the target speed based on the location information of the neighboring vehicle 200 detected in the detection zone.

As shown in FIG. 4, the computing device 30 may classify the detection zone of the neighboring vehicle 200 into a plurality of sub-zones according to the level of collision risk between the vehicle 100 and the neighboring vehicle 200 based on the location information calculated by the neighboring vehicle information device 70.

For example, the zone may be partitioned into sub-zones in various shapes like sections A, B, and C as shown in FIG. 4. The collision risk is reduced in order of A, B, and C, and the computing device 30 may compute to reduce the target speed by increasing the subtraction speed according to the level of collision risk in each partitioned zone.

In addition, the computing device 30 may compute to reduce the target speed when a lateral movement of the neighboring vehicle 200 is determined by the neighboring vehicle information device 70.

When the neighboring vehicle 200 laterally moves on a curved road, the probability of collision with the vehicle 100 increases and the target speed needs to be reduced at this time.

When the neighboring vehicle information device 70 determines lateral movement information of the neighboring vehicle 200, the computing device 30 may compute to reduce the target speed by increasing the subtraction speed.

when the present location is in the cautious driving zone according to the road information calculated by the road information device 10, the computing device 30 may reduce the target speed.

The road information device 10 may be connected to the navigator 11 to calculate the present location of the vehicle 100.

Accordingly, when the road information calculated by the road information device 10 shows that the present location of the vehicle 100 is in the cautious driving zone such as a tunnel or bridge and that the cautious driving zone is a curved road according to the road information entered into the navigator 11 in advance, the computing device 30 may compute to reduce the target speed.

The computing device 30 may compute the reference speed of the vehicle 100 based on the radius of curvature of the curved road calculated by the road information device 10, compute a weight based on the road surface condition calculated by the road surface information device 20, compute the subtraction speed based on the weight, and compute the target speed by subtracting the subtraction speed from the reference speed.

As shown in FIG. 2, when the vehicle 100 enters a curved road, the computing device 30 may compute the reference speed of the vehicle 100 on the curved road. The reference speed may be computed based on the radius of curvature of the curved road calculated by the road information device 10, the subtraction speed may be computed based on the road surface information calculated by the road surface information device 20, and the target speed may be computed by subtracting the subtraction speed from the reference speed.

At this time, the computing device 30 may compute the weight based on the road surface information such as a friction coefficient of the road surface or pavement condition of the road calculated by the road surface information device 20 and compute the subtraction speed based on the weight.

The computing device 30 may calculate the subtraction speed by putting the computed weight into a pre-mapped map.

The weight computed by the computing device 30 increases as the target speed reduction factor, to be described below, increases, and there is the effect that the computing device 30 may compute the subtraction speed quickly by putting the computed weight into the pre-mapped map.

The road surface information device 20 may be connected to the road surface detection sensor 21 mounted in the vehicle 100 to calculate the friction coefficient of the driving road, and the computing device 30 may compute the target speed based on the friction coefficient.

As shown in FIG. 3, the road surface detection sensor 21 mounted in the conventional vehicle 100 and the road surface information device 20 may be connected to each other to calculate the road surface condition information.

The road surface detection sensor 21 may be an ultrasonic sensor mounted in a lower portion of the vehicle 100 and detect roughness or icing state of the road surface, and the road surface information device 20 may calculate the friction coefficient based thereon.

At this time, the road surface condition information may be arithmetically calculated through the friction coefficient, and the computing device 30 may compute the target speed based on the friction coefficient.

The computing device 30 may compute the weight in proportion to the magnitude of the friction coefficient of the driving road calculated by the road surface information device 20, compute the reference speed based on the road information calculated by the road information device 10, compute the subtraction speed based on the weight, and compute the target speed by subtracting the subtraction speed from the reference speed.

The computing device 30 may compute the reference speed based on the radius of curvature of the driving road, compute the subtraction speed based on the road surface friction coefficient of the driving road calculated by the road surface information device 20, and compute the target speed by subtracting the subtraction speed from the reference speed as described above.

The computing device 30 may set weights in proportion to the road surface friction coefficients and compute the subtraction speed by putting the weight into the pre-mapped map.

When the present location is in the cautious driving zone according to the road information calculated by the road information device 10, the computing device 30 may reduce the target speed.

The road information device 10 may be connected to the navigator 11 to calculate the present location of the vehicle 100.

Accordingly, when the road information calculated by the road information device 10 shows that the present location of the vehicle 100 is in a caution driving zone such as a bridge or tunnel and that the cautious driving zone is a curved road according to the road information entered into the navigator 11 in advance, the computing device 30 may compute to reduce the target speed.

A temperature information device 40 connected to a temperature sensor 41 mounted in the vehicle 100 to calculate the temperature information outside the vehicle 100 may be further included, and the computing device 30 may compute the target speed in proportion to the temperature information calculated by the temperature information device 40.

A conventional vehicle 100 may be provided with a temperature sensor 41 measuring the outside temperature and the temperature information device 40 may be connected to the temperature sensor 41 of the vehicle 100 to calculate the temperature information.

When the temperature outside the vehicle 100 drops, the road gets frozen and the icing on the curved road gets more treacherous. In preparation for this, the computing device 30 may compute to reduce the target speed when the temperature information calculated by the temperature information device 40 is equal to or lower than a predetermined reference temperature.

This has the effect of decreasing the probability of a slip of the vehicle 100 or a collision, caused by the slip, with a neighboring vehicle or obstacle.

A luminance information device 50 connected to a luminance sensor 51 mounted in the vehicle 100 to calculate the luminance information outside the vehicle 100 may be further included, and the computing device 30 may compute the target speed in inverse proportion to the luminance information calculated by the luminance information device 50.

A convention vehicle 100 is provided with the luminance sensor 51 detecting luminance outside the vehicle 100 for automatic lighting of headlights and cabin lights, and the luminance information device 50 is connected to the luminance sensor 51 to calculate the luminance information outside the vehicle 100.

When the luminance outside the vehicle 100 is lowered, the probability of collision accident of the vehicle 100 increases so that the computing device 30 may compute to reduce the target speed when the calculated luminance information is equal to or lower than a reference value predetermined in the luminance information device 50.

A driver detection device 60 calculating the driving concentration level of the driver may be further included, and the computing device 30 may compute the target speed in inverse proportion to the driving concentration level calculated by the driver detection device 60.

The driver detection device 60 may detect pupil movements, eyelid movements, or facial expressions of the driver through an image of the driver's face captured by a camera mounted inside the vehicle 100 and calculate the driving concentration level of the driver based on these, or may be connected to a torque sensor of the steering wheel to detect a shaking of the steering wheel and calculate the driving concentration level of the driver.

The driver detection device 60 calculates such that the driving concentration level is low when the driver detection device 60 detects trembling of driver's pupils equal to or greater than a reference value in an image captured by a camera, covering of the pupils by the eyelids equal to or greater than a reference value, yawning of the driver, or shaking of a torque sensor of the steering wheel equal to or greater than a reference value.

When the driver detection device 60 calculates such that the driving concentration level is low, the computing device 30 may compute to reduce the target speed and inform the driver of the reduced target speed that allows the driver to drive safely on a curved road.

Figure 5:
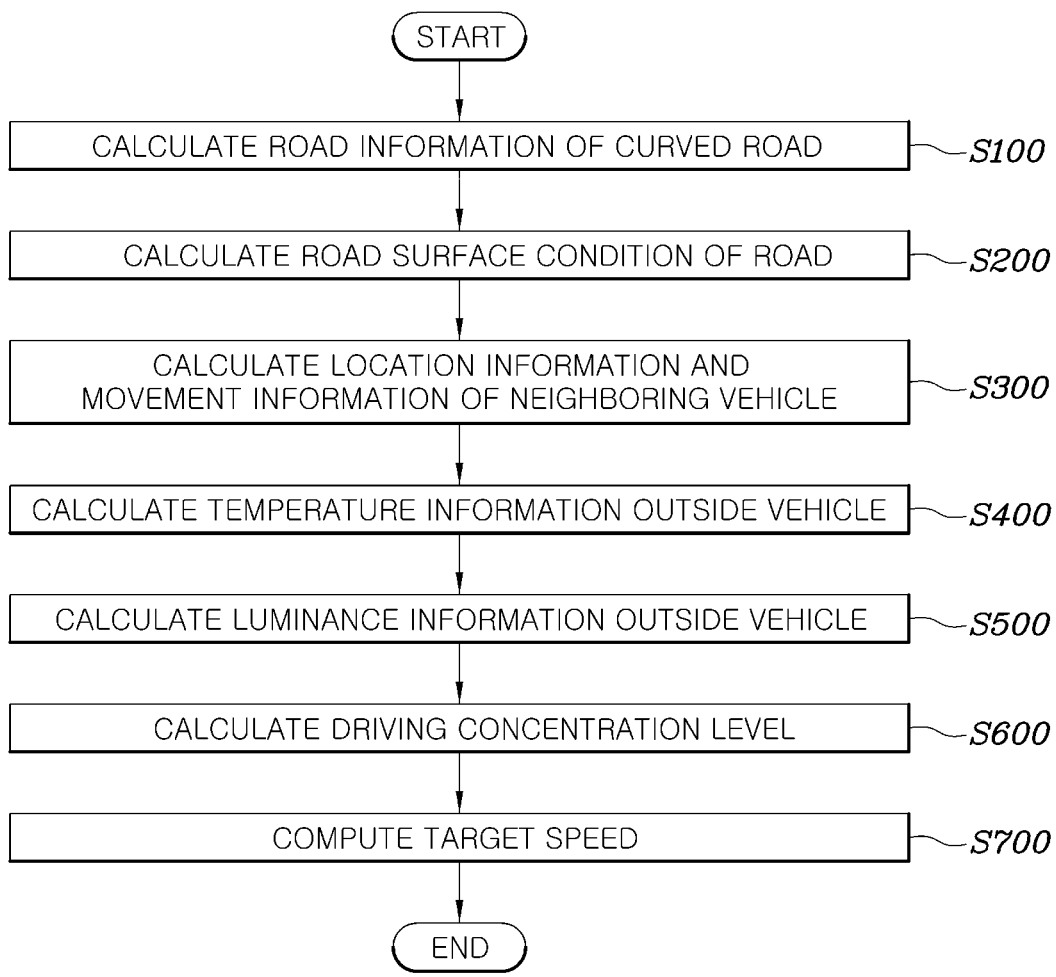
FIG. 5 is a flowchart of a vehicle driving control method according to an embodiment of the present disclosure.

FIG. 5 is a flowchart of a driving control method of a vehicle 100 according to an embodiment of the present disclosure.

A preferable embodiment of the driving control method of the vehicle 100 according to the present disclosure will be described with reference to FIG. 5.

The driving control method of the vehicle 100 may include calculating road information of a curved road on which the vehicle 100 drives (S100), calculating road surface condition of a road (S200), calculating location information or movement information of a neighboring vehicle 200 located close to the vehicle 100 (S300); and computing a target speed (S700) based on the road information calculated in the calculating of the road information (S100), the road surface condition calculated in the calculating of the road surface information (S200), and the location information or movement information of the neighboring vehicle 200 calculated in the calculating of the location information or movement information (S300).

Calculating temperature information outside the vehicle 100 (S400) may be further included, and, in the computing of the target speed (S700), the target speed may be computed in proportion to the temperature information calculated in the calculating of the temperature information (S400).

Calculating luminance information outside the vehicle 100 (S500) may be further included, and, in the computing of the target speed (S700), the target speed may be computed in inverse proportion to the luminance information calculated in the calculating of the luminance information (S500).

Detecting a driver (S600) for calculating a driving concentration level of the driver may be further included, and, in the computing of the target speed (S700), the target speed may be computed in inverse proportion to the driving concentration level calculated in the detecting of the driver (S600).

Specific embodiments of the present disclosure are illustrated and described, but it will be self-evident to those skilled in the art that the present disclosure may be improved upon and modified in various ways within the scope not departing from the technical spirit of the present disclosure provided by the patent claims below.

What is claimed is:

1. A vehicle driving control system comprising:
   a road information device calculating road information of a curved road on which a vehicle drives;
   a road surface information device calculating a road surface condition of a road;
   a neighboring vehicle information device calculating location information or movement information of a neighboring vehicle located close to the vehicle;
   a computing device computing a target speed based on the road information calculated by the road information device, the road surface condition calculated by the road surface information device, and the location information or the movement information of the neighboring vehicle calculated by the neighboring vehicle information device; and
   a processor controlling driving of the vehicle based on the computed target speed,
   wherein the road information device is connected to a navigator mounted in the vehicle to calculate a radius of curvature of the curved road based on information obtained from the navigator, and
   wherein the computing device computes a reference speed of the vehicle based on the radius of curvature of the curved road calculated by the road information device, calculates a weight based on the road surface condition calculated by the road surface information device, computes a subtraction speed based on the weight, and computes the target speed by subtracting the subtraction speed from the reference speed.

2. The system of claim 1, wherein the computing device computes the subtraction speed by putting the weight into a pre-mapped map.

3. The system of claim 1, wherein the computing device reduces the target speed when a present location of the vehicle is in a cautious driving zone according to the road information calculated by the road information device.

4. The system of claim 1, wherein the computing device computes to reduce the target speed when the neighboring vehicle information device calculates lateral movement of the neighboring vehicle.

5. A vehicle driving control method comprising:
calculating, by a processor, road information of a curved road on which the vehicle drives;
calculating, by the processor, a road surface condition of a road;
calculating, by the processor, location information or movement information of a neighboring vehicle located close to the vehicle;
computing, by the processor, a target speed based on the road information calculated in the calculating of the road information and the road surface condition calculated in the calculating of the road surface information; and
controlling, by the processor, driving of the vehicle based on the computed target speed,
wherein the computing of the target speed comprises:
calculating a radius of curvature of the curved road based on the road information of the curved road;
computing a reference speed of the vehicle based on the radius of curvature of the curved road;
calculating a weight based on the road surface condition;
computing a subtraction speed based on the weight, and computing the target speed by subtracting the subtraction speed from the reference speed.

6. The method of claim 5, wherein the computing of the target speed further comprises computing the subtraction speed by putting the weight into a pre-mapped map.

7. The method of claim 5, wherein the computing of the target speed further comprises reducing the target speed when a present location of the vehicle is in a cautious driving zone according to the road information.

8. The method of claim 5, wherein the computing of the target speed further comprises reducing the target speed when calculating lateral movement of the neighboring vehicle.

* * * * *